United States Patent [19]

Glitz

[11] 4,211,891
[45] Jul. 8, 1980

[54] METHOD FOR SETTING CODE TEXT GENERATORS IN CIPHERING DEVICES

[75] Inventor: Ekkehard Glitz, Backnang, Fed. Rep. of Germany

[73] Assignee: Licentia Patent-Verwaltungs-G.m.b.H., Frankfurt am Main, Fed. Rep. of Germany

[21] Appl. No.: 878,442

[22] Filed: Feb. 16, 1978

[30] Foreign Application Priority Data

Feb. 16, 1977 [DE] Fed. Rep. of Germany ....... 2706421

[51] Int. Cl.² .............................................. H04L 9/04
[52] U.S. Cl. ......................................... 375/2; 375/106
[58] Field of Search ................................. 178/22, 69.1

[56] References Cited

U.S. PATENT DOCUMENTS

| | | | |
|---|---|---|---|
| 3,876,832 | 4/1975 | Morgan et al. | 178/22 |
| 4,058,673 | 11/1977 | Johansson | 178/22 |
| 4,095,046 | 6/1978 | Frutiger | 178/22 |
| 4,133,973 | 1/1979 | Branscome et al. | 178/22 |
| 4,133,974 | 1/1979 | Morgan | 178/22 |

*Primary Examiner*—Howard A. Birmiel
*Attorney, Agent, or Firm*—Spencer & Kaye

[57] ABSTRACT

In a procedure in which data is ciphered at a transmitter by being linked with key data generated by a code text generator and is deciphered at a receiver by appropriate linkage of the ciphered data with the same key data generated by an identical code text generator, the code text generator in the transmitter produces a pseudorandom sequence which determines the starting state of the generator and a formation rule, and the code text generator of the receiver is set to produce the same pseudorandom sequence by transmission from the transmitter to the receiver of an enciphered signal sequence defining the starting state and formation rule which determines the sequence to be produced by the transmitter code text generator.

8 Claims, 10 Drawing Figures

TRANSMITTER

RECEIVER

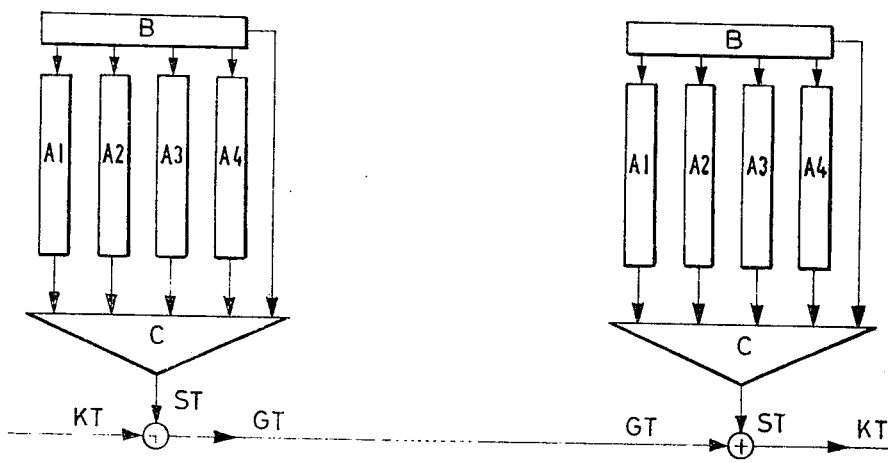
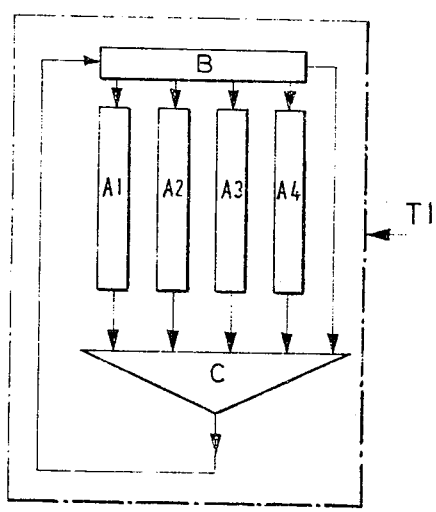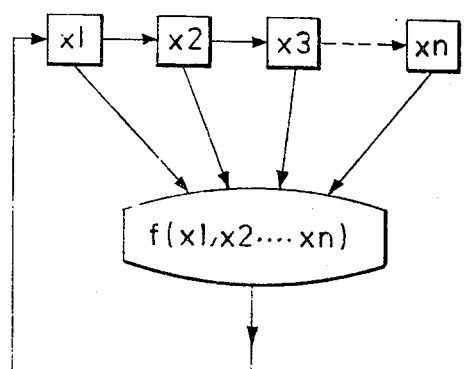

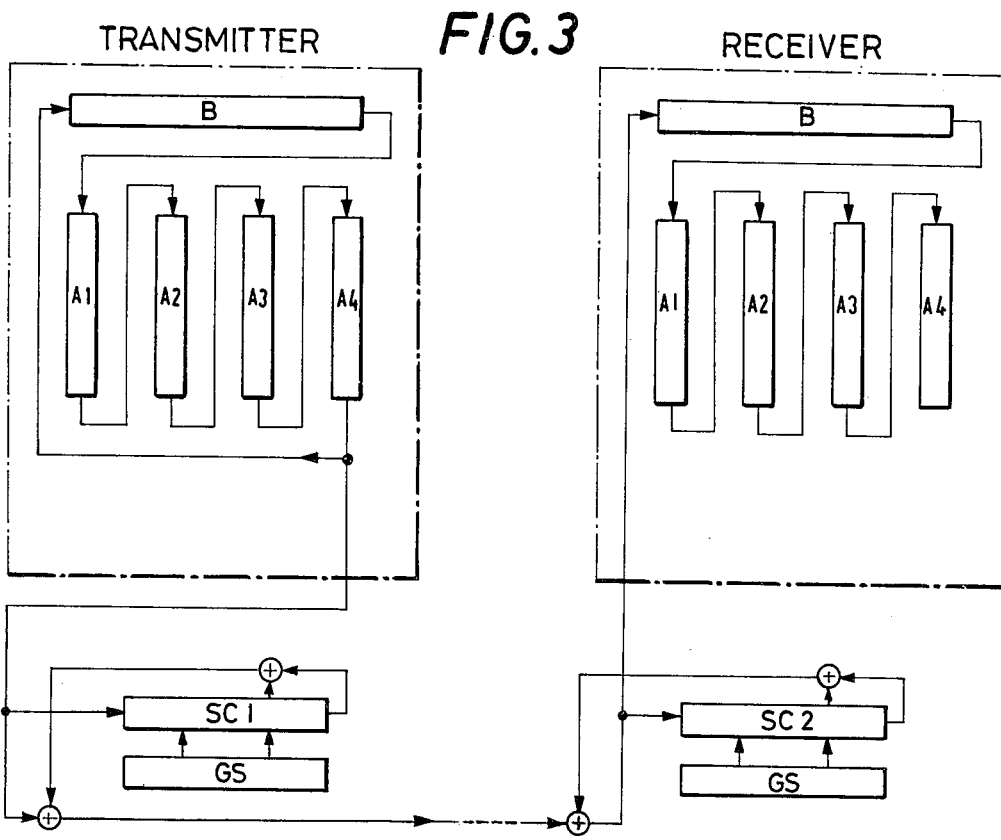
FIG.3
TRANSMITTER  RECEIVER
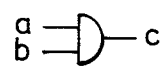   
$c = a \cdot b$   $c = a + b$   $c = a \oplus b$   NEGATION
FIG.5
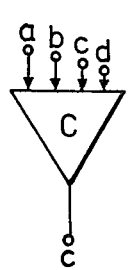 = 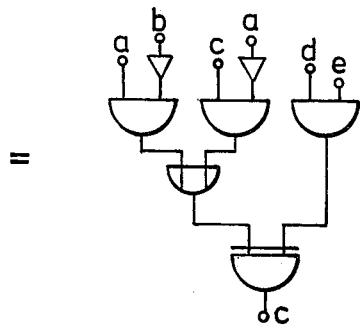
COMBINER C    $c = (a \cdot \bar{b} + c \cdot \bar{a}) \oplus (d \cdot e)$

METHOD FOR SETTING CODE TEXT GENERATORS IN CIPHERING DEVICES

BACKGROUND OF THE INVENTION

The present invention relates to a method for ciphering and deciphering data transmissions between a transmitter and at least one receiver of the type in which clear data are combined with key data, or streams, at the transmitting end, and at the receiving end the clear data are recovered by linking the ciphered transmission with identical key data and in which the same basic key is available in stored form at the transmitting end and at the receiving end.

The present invention serves not only to secure data against unauthorized access during the transmission between remote transmitters and receivers but also, for example, to secure data against unauthorized access during processing within a system where such unauthorized access to the data is to be prevented.

German Auslegeschrift [Published Application] No. 12 37 366 describes such a process in which the starting state of a code text generator is set in dependence on the result of mixing of a first state information sequence with a second state information sequence, the first state information sequence being generated at the transmitting end, preferably by means of a random, or pseudo-random, sequence generator, and being transmitted in the clear to the receiving end.

This process has the drawback that the rule for forming the binary signal sequence of the code text is fixed by the hard wiring of the code text generator and a change in the starting state merely permits the selection of another portion of the total code text sequence as the new code text. Moreover, a new additional code must be generated for every setting by means of a pseudorandom generator.

German Offenlegungsschrift [Laid-Open Application] No. 24 57 027 and counterpart U.S. Pat. No. 4,032,763 disclose a method for setting a code text generator in which a basic code word is determinative for the starting state of the code text generator and an additional code word in conjunction with the basic code word establishes the formation rules for the pseudorandom binary signal sequence generation of the code text.

This process thus does not operate according to a rigid formation rule for the binary signal sequence of the code text and is therefore significantly more secure against unauthorized decoding, but it would be much too expensive to use, if with the same security, it were to be used for transmission to a plurality of receivers which begin receiving at different times, i.e. if within short periods of time new additional codes would have to be repeatedly generated, transmitted and set.

SUMMARY OF THE INVENTION

It is an object of the present invention to provide a method which, with the greatest possible security, provides broadcast capability and requires inexpensive circuitry.

This and other objects are achieved according to the invention, by the practice of a novel method for synchronisation of ciphering equipments between a transmitter including a code text generator and at least one receiver including a code text generator in which clear text data are linked with key data at the transmitting end and are recovered at the receiving end by linkage with identical key data and in which the same prime data is present in a stored state at the transmitter and at the receiver, each code text generator including a plurality of code text forming registers. The method according to the invention involves the following steps, carried out before the transmission of data: randomly jumbling in the code text generator at the transmitter, with a fixed or randomly changing formation rule, at least one code text forming register over a minumum period of time with a nonperiodic continuous clock pulse which is different from the transmission clock pulse until a random bit sequence of elements which can, for example, be composed of 50 elements, has been generated in the code text forming registers, retaining such random bit sequence to constitute prime data which defines the starting state for the code text generators at the transmitter and at the receiver, transmitting such random bit sequence from the transmitter to the receivers while cyclically shifting the code text forming registers at the transmitter so that, after transmitting, the code text generators at the transmitter and at the receiver have the same starting state, this transmitting including transmitting an identifying word indicating start of transmission of the starting state of the code text generators in the transmitter and then transmitting a representation of that starting state in an enciphered form with a basic key information which is defined at the transmitter and at the receiver; and deriving the formation rule of each code text generator from the random bit sequence generated at the transmitter and transmitted in an enciphered form to the receiver.

In addition, during the transmission of data, repeated synchronization is effected by temporarily interrupting the flow of data and performing, during such interruption, the steps of: retaining the bit sequence in the code text forming registers of the transmitter at the moment of interruption to define a new starting state, or new prime data, for the code text generator of each receiver connected to receive such data transmission; or to check the synchronism of such receivers which have synchronised any time before marking the bit sequence retained at the transmitter at the moment of interruption by an identifying marker; transmitting this bit sequence in enciphered form by means of a basic key information which is identical at the transmitter and the receiver; and deriving the formation rule of each code text generator from the retained bit sequence of the code text forming registers at the transmitter and the receiver.

The "formation rule" mentioned above is simply a selected sequence of bits which controls the operation of a code text generator and which remains unchanged between successive synchronization steps. Thus, the "formation rule" constitutes a type of stored program for the code text generator.

BRIEF DESCRIPTION OF THE DRAWINGS

FIG. 1 is a block circuit diagram of the basic structure of coding devices according to the invention.

FIG. 2 is a block diagram illustrating continuous jumbling operation of the code text generator at a transmitting location before synchronization.

FIG. 3 is a diagram illustrating the principle of enciphered transmission of the register states for identical setting of the code text generators at the transmitting and receiving ends.

FIG. 4 is a general diagram of an embodiment of a code text forming register A.

FIG. 5 illustrates the possible embodiment of an associating switching network C.

DESCRIPTION OF THE PREFERRED EMBODIMENTS

FIG. 1 illustrates code text generators located both at a transmitter and a receiver. Each generator includes a plurality of code text forming registers A1 to An, for example, feedback connected shift registers whose feedback networks can be programmed. In the illustrated embodiment, n=4. Furthermore, an associating switching network C is provided to set the linkages between the individual registers. Furthermore there is a formation rule register B having a storage capacity of n bits so that it is possible to set $2^n$ different formation rules in the generator.

In principle, the data ciphering operates as follows: at the transmitting end a clear text KT is linked with the key data ST with the aid of a linking member, e.g. a modulo 2 adder, to produce the enciphered, secret, text GT which is then transmitted. At the receiving end, the secret text GT is linked with the same key data ST, which has been obtained according to identical formation rules, to produce the clear text again.

In a continuous jumbling operation of the code text generator before synchronization, as shown in FIG. 2, the starting state of the code text generator is obtained by random jumbling to establish the starting code, or prime data, in the transmitter and in the receiver. After the operating voltage has been applied, the registers A and the formation rule register B take on an indeterminate starting position which is changed again during continuous jumbling operation. During this continuous jumbling operation a freely running clock pulse T1 from an astable multivibrator or from a random sequence generator is applied so as to switch on registers A, asynchronously with the transmission clock pulse, by an indeterminate number of continuous clock pulses.

The code text generator here operates initially with an indeterminate formation rule which is stored in the formation rule register B and which during continuous jumbling operation is continuously changed in that the bit sequence linked by the associating switching network C is shifted through the formation rule register B.

Figure 10:
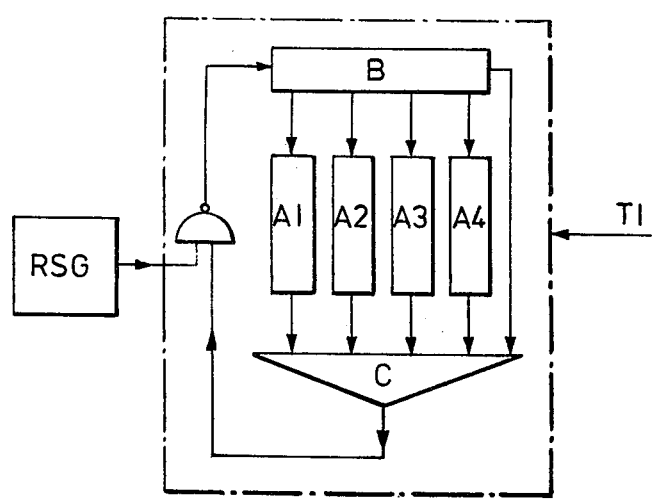
FIG. 10 is a block diagram illustrating continuous jumbling operation with a random sequence generator.

In a variation of the continuous jumbling operation, (claim 7, FIG. 10) an additional random sequence generator is connected in the circuit, for example, between the output of the associating network C and the input of the formation rule register B so as to control the random jumbling process.

The freely running continuous jumbling operation is continued for a certain minimum time after which this mode of operation can be interrupted at any desired point in time by stopping the clock pulse train T1. At the time of "end of continuous jumbling operation", all register elements of the code text generator have a randomly determined starting position, i.e. a random formation rule and a random starting position for the code text generator have been obtained "by the throw of the dice". The contents of registers A and B together define the prime data for the system.

In order to establish a ciphered data connection between a transmitter and one or a plurality of receivers, the receivers must be informed of the formation rule and the starting position of the transmitting code text generator.

For this purpose, as shown in FIG. 3, the code text forming registers A and the formation rule registers B in the receiver are cleared and those in the transmitter and the receiver are connected in series, the registers in the transmitter are read out serially and are received serially at the receiver so that after a number of transmission step clock pulses corresponding to the total number of stages of registers A and B in the transmitter there is coincidence of the starting position at the transmitting and receiving ends for all register locations of code text forming registers A and of formation rule registers B.

In the case of a ciphered data transmission, only those users which have been authorized to decode the data by means of the basic key are to be able to perform such deciphering. Therefore, transmission of the register states of the code text generator at the transmitting end must be effected in enciphered form to the receivers. The ciphering can be produced, for example, by means of linearly feedback coupled shift registers SC1 and SC2 which are also known as "scramblers".

These shift registers are of identical configuration at the transmitting and receiving ends and their presetting is determined by a basic key GS which has been agreed upon between the communicating parties.

Figure 8:
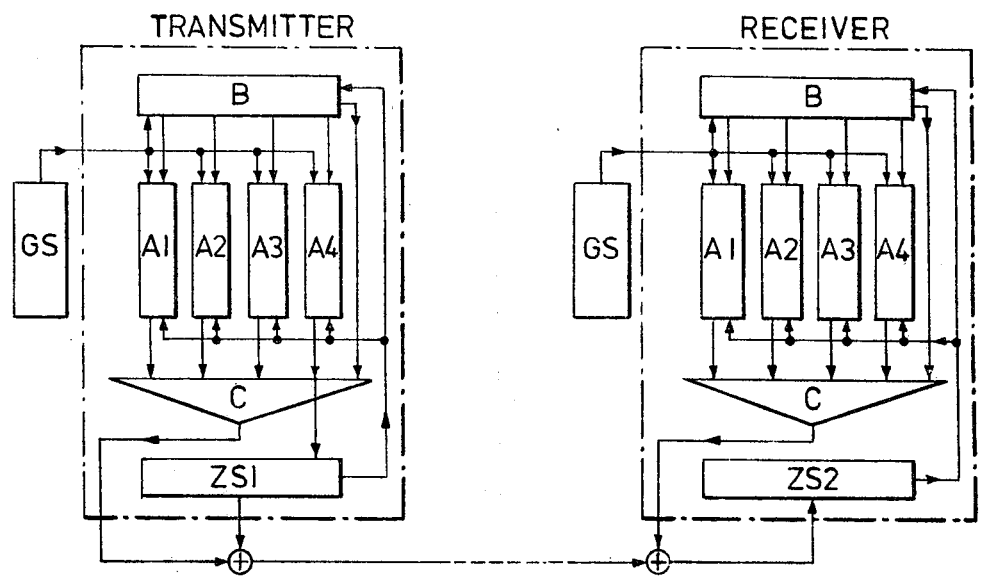
FIG. 8 is a diagram illustrating the principle of synchronization with intermediate memories ZS1 and ZS2.

According to another embodiment of the invention (claim 3, FIG. 8), the starting position, or prime data, of the code text generator, obtained at random during continuous jumbling operation thereof, is stored in an intermediate memory ZS1. Then the basic key GS is used to set individual ones or all of the code text forming registers A and/or the formation rule register B at the transmitting and receiving ends. For the enciphered transmission of the starting position of the code text generator, the linking member (FIG. 1) receives the clear text of the prime data which has been stored in the intermediate memory ZS1 and the code text ST from the code text generator as determined by the basic key GS. The starting state which is transmitted as secret text GT is recovered at the receiving end as clear text KT and is stored in an intermediate memory ZS2. Before the actual data transmission begins, the prime data from intermediate memory ZS1 or ZS2, respectively, is introduced into the code text generator at the transmitting and receiving ends.

During the enciphered data transmission the code text forming registers A at the transmitting and receiving ends are switched on in synchronism but the register states of each formation rule register B remain unchanged until new prime data is set.

With one-time synchronization of a coded data transmission the formation rule and the starting state of each code text generator are obtained at random at the transmitting end and are transmitted to the receivers.

Figure 9:
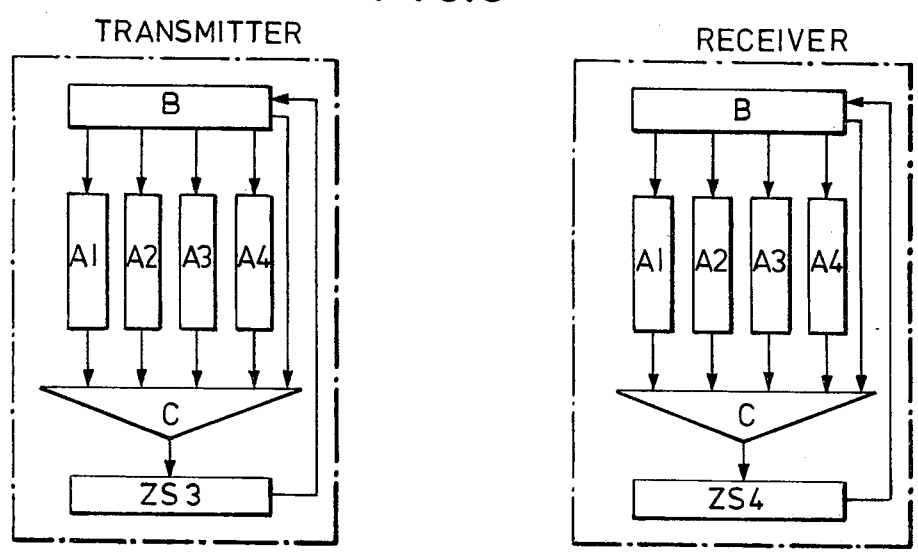
FIG. 9 shows the principle of derivation of the formation rule and storing in the intermediate memories ZS.

According to another embodiment (claim 6, FIG. 9), the formation rule of the code text generator is derived at the transmitting end and at the receiving ends so that enciphered transmission of the formation rule is not necessary. The formation rule is computed in the code text generators at the transmitting and receiving ends on the basis of the starting state of the code text forming registers A1 to An and according to an agreed upon formula and is stored at the transmitting and receiving ends in intermediate stores ZS3 and ZS4, respectively. Before the actual enciphering or deciphering, respectively, of the data the formation rule is transferred from the respective intermediate store ZS3 or ZS4 into the respective formation rule register B of the code text generator.

In contradistinction thereto, with repeated synchronization, as is necessary for broadcast operation, the transmitter retransmits at fixed points in time the actual register state of the code text forming registers A and, if required, its new or unchanged formation rule in the formation rule register B. Newly added receivers then have an opportunity to phase themselves into ongoing transmissions. To accomplish this, the code text generator need only interrupt the normal data flow for the required number of clock pulses at a time.

Components of the code text generator and the arrangements of the transmitter and the receiver are illustrated in the FIGS. 4, 5, 6 and 7.

In FIG. 4 is illustrated as general diagram a feedback shiftregister, which is published in this form in S. W. Golomb: "Shiftregisters", Chapter 2.

The function of this arrangement or this "formation rule" can be expressed in the form $$f(x1, x2, \ldots xn) = c1 \times 1 \oplus c2 \times 2 \oplus c3 \times 3 \oplus \ldots \oplus cn \, xn$$

The code text generator includes a plurality of such feedback shiftregisters in a special form called code text forming registers and the "formation rule" of the text forming registers and the associating networks can be expressed as function with variables, which can be stored in a formation rule register B.

In FIG. 5 is illustrated an example of an associating switching network C with commonly available logic circuits.

Figure 6:
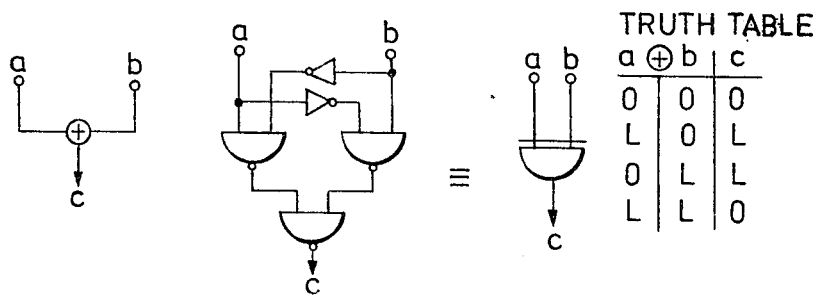
FIG. 6 illustrates the principle of a Modulo 2 Adder.

In FIG. 6 is shown the principle of a commonly available Modulo 2 Adder with its associated table.

Figure 7:
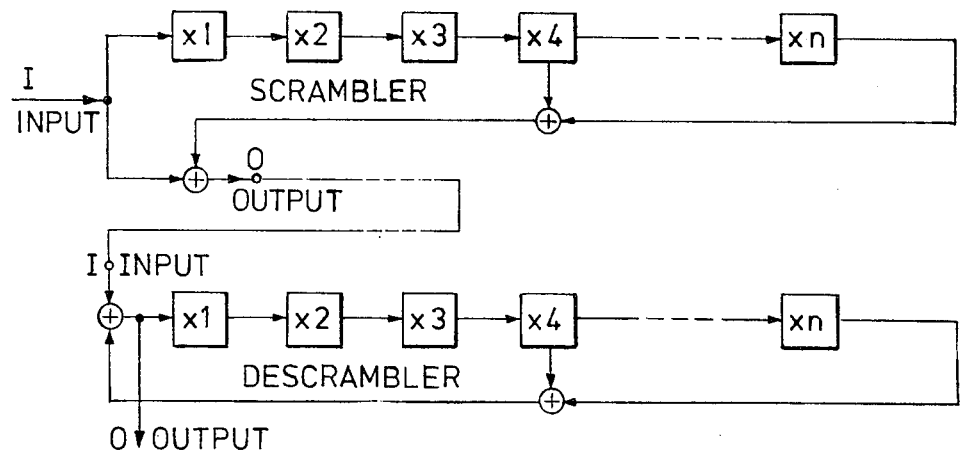
FIG. 7 is a diagram illustrating the principle of a scrambler and a descrambler.

FIG. 7 illustrates the principle of a scrambler and descrambler. Such arrangements are published for example in the CCITT Orange Book Volume VIII 1 Recommendation V. 27.

It will be understood that the above description of the present invention is susceptible to various modifications, changes and adaptations, and the same are intended to be comprehended within the meaning and range of equivalents of the appended claims.

What is claimed is:

1. In a method for enciphering and deciphering the transmission of data between a transmitter including a code text generator and at least one receiver including a code text generator in which clear text data are linked with key data at the transmitting end and are recovered at the receiving end by linkage with identical key data and in which the same basic key is present in a stored state at the transmitter and at the receiver, each code text generator including a plurality of code text forming registers, the improvement comprising, before the transmission of data:

randomly jumbling, in the code text generator at the transmitter, with a fixed or a randomly changing formation rule, at least one code text forming register over a minimum period of time, with a nonperiodic continuous clock pulse which is different from the transmission clock pulse until a random bit sequence of elements has been generated in the code text forming registers;

retaining such random bit sequence to define the prime data for the code text generators at the transmitter and at the receiver;

transmitting such random bit sequence from the transmitter to the receiver while cyclically shifting the code text forming registers at the transmitter so that after said transmitting, the code text generators at the transmitter and at the receiver have the same prime data, said step of transmitting including transmitting an identifying word indicating start of transmission of the prime data of the code text generators in the transmitter and then transmitting a representation of that prime data in an enciphered form with the basic key which is defined at the transmitter and at the receiver;

deriving the formation rule of each code text generator from the random bit sequence generated at the transmitter and transmitted in an enciphered form to the receiver, and during the transmission of data effecting repeated synchronization by temporarily interrupting the flow of data and performing, during such interruption, the steps of:

retaining the bit sequence in the code text forming registers of the transmitter at the moment of interruption to define new prime data for the code text generator of each receiver connected to receive such data transmission; or to check the synchronization of such receivers which have synchronized any time before, marking the bit sequence retained at the transmitter at the moment of interruption by an identifying marker, transmitting this bit sequence in enciphered form by means of a basic key information which is identical at the transmitter and the receiver; and deriving the formation rule of each code text generator from the retained bit sequence of the code text forming registers at the transmitter and the receiver.

2. Method as defined in claim 1 wherein, said step of transmitting a representation is effected with the aid of a lineraly feedback connected shift register whose presetting and/or formation rule depend on the basic key.

3. Method as defined in claim 1 wherein said step of randomly jumbling is effected by operation of the transmitter arrangement itself and with the aid of the basic key said step of retaining before transmission is carried out by initially storing a representation of the prime data of the transmitter code text generators in a first intermediate memory, said step of transmitting a representation further includes deciphering the representation of the prime data at the receiver and storing such deciphered representation in a second intermediate memory, and transferring the stored representations from the first and second memories to the code text generators of the transmitter and the receiver, respectively.

4. Method as defined in claim 1 wherein said step of randomly jumbling includes randomly operating a first portion of the code text forming registers at the transmitter and transmitted in the enciphered form to the receivers and setting a second portion of the code text forming registers in the transmitter and in the receiver in dependence on the basic key.

5. Method as defined in claim 1 wherein said step of deriving the formation rule is carried out at the transmitter by a random jumbling operation and includes the enciphered transmitting of a representation of the formation rule in addition to the enciphered transmitting of the representation of the starting state to the receiver.

6. Method as defined in claim 1 wherein said step of deriving the formation rule is carried out by computing the rule in the code text generators of both the transmitter and the receiver after transmitting the representation of the starting state in code text forming registers according to a prearranged formula, storing a representation of the computed rule in an intermediate memory in the transmitter and in an intermediate memory in the receiver, and transferring such representation from each intermediate memory to an associated formation rule register forming part of a respective code text generator at the transmitter and at the receiver.

7. Method as defined in claim 1 wherein said step of randomly jumbling is carried out with the aid of a random sequence generator to get a real random sequence in the text forming registers and in the formation rule register.

8. Method as defined in claim 1 wherein the random bit sequence which represents the prime data of the code text generator contains at least 50 elements.

* * * * *